_(12)_ United States Patent
Ando et al.

(10) Patent No.: US 10,032,559 B2
(45) Date of Patent: Jul. 24, 2018

(54) ELECTRONIC COMPONENT

(71) Applicant: TDK CORPORATION, Tokyo (JP)

(72) Inventors: Norihisa Ando, Tokyo (JP); Atsushi Takeda, Nikaho (JP); Hideki Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/389,181

(22) Filed: Dec. 22, 2016

(65) Prior Publication Data

US 2017/0186538 A1 Jun. 29, 2017

(30) Foreign Application Priority Data

Dec. 28, 2015 (JP) ................. 2015-256351

(51) Int. Cl.
 *H01G 4/232* (2006.01)
 *H01G 4/30* (2006.01)
 *H01G 4/12* (2006.01)
(52) U.S. Cl.
 CPC ............ *H01G 4/2325* (2013.01); *H01G 4/30* (2013.01); *H01G 4/12* (2013.01)
(58) Field of Classification Search
 CPC ........... H01G 4/2325; H01G 4/30; H01G 4/12
 See application file for complete search history.

(56) References Cited

U.S. PATENT DOCUMENTS

| | | | | |
|---|---|---|---|---|
| 8,861,180 B2* | 10/2014 | Lee | .......... | H01G 4/30 |
| | | | | 361/321.2 |
| 9,543,076 B2* | 1/2017 | Kim | .......... | H01G 4/30 |
| 2011/0007449 A1* | 1/2011 | Seo | .......... | H01G 4/232 |
| | | | | 361/321.2 |
| 2016/0099106 A1* | 4/2016 | Kurokawa | .......... | H01G 4/0085 |
| | | | | 361/301.4 |

FOREIGN PATENT DOCUMENTS

JP H05-144665 A 6/1993

* cited by examiner

*Primary Examiner* — Dion R Ferguson
(74) *Attorney, Agent, or Firm* — Oliff PLC

(57) ABSTRACT

An electronic component is provided with an element body and terminal electrodes. The terminal electrodes include sintered metal layers and conductive resin layers. A first length, which is a length of the sintered metal layers in a first direction at end portions of a side surface in a second direction, is shorter than a second length, which is a length of the sintered metal layers in the first direction at central portions of the side surface in the second direction. A third length, which is a length of the conductive resin layers in the first direction at the end portions, is shorter than a fourth length, which is a length of the conductive resin layers in the first direction at the central portions. A difference between the fourth length and the third length is larger than a difference between the second length and the first length.

5 Claims, 4 Drawing Sheets

ELECTRONIC COMPONENT

TECHNICAL FIELD

One aspect of the present invention relates an electronic component.

BACKGROUND

Known electronic components are provided with a capacitor main body and external electrode layers formed on the end surfaces of the capacitor main body (e.g., refer to Japanese Unexamined Patent Publication No. H05-144665). Each of the external electrode layers includes a sintered metal layer formed on the surfaces of the capacitor main body and a conductive adhesive resin layer formed to completely cover the sintered metal layer. In this electronic component, the stress applied to the capacitor main body is relaxed by forming the conductive adhesive resin layer, thereby preventing the occurrence of cracking on the capacitor main body.

SUMMARY

An object of one aspect of the present invention is to provide an electronic component which can improve the reliability and relax the stress applied to an element body.

An electronic component according to one aspect of the present invention is provided with an element body and a pair of terminal electrodes. The element body has a rectangular parallelepiped shape. The element body has a pair of end surfaces opposing each other and a side surface connecting the end surfaces to each other. Internal conductors are exposed at the pair of end surfaces. The pair of terminal electrodes is separated from each other in a first direction where the pair of end surfaces opposes. The pair of terminal electrodes is connected to the internal conductors. The terminal electrodes include sintered metal layers and conductive resin layers. The sintered metal layers are disposed on the end surfaces and on the side surface. The conductive resin layers are disposed to entirely cover the sintered metal layers. A first length is shorter than a second length. The first length is a length of the sintered metal layers in the first direction at end portions of the side surface in a second direction. The second direction is orthogonal to the first direction. The second length is a length of the sintered metal layers in the first direction at central portions of the side surface in the second direction. A third length is shorter than a fourth length. The third length is a length of the conductive resin layers in the first direction at the end portions. The fourth length is a length of the conductive resin layers in the first direction at the central portions. A difference between the fourth length and the third length is larger than a difference between the second length and the first length.

In an electronic component according to one aspect of the present invention, sintered metal layers are disposed not only on the end surfaces, but also on the side surface. This can suppress the occurrences of a short circuit failure and the like due to invasion of water and the like. The conductive resin layers are disposed to completely cover the sintered metal layers. Thus, for example, when the electronic component is soldered to be implemented onto other electronic devices, the stress applied to an element body upon solidification of molten solder can be relaxed.

When the sintered metal layers are formed, more stress is applied to ridgeline portions of the element body than other portions. Thus, the ridgeline portions of the element body are prone to cracking and the like due to sintering. Thereupon, the first length is designed to be shorter than the second length. This relaxes the stress applied to the ridgeline portions of the element body by the amount the first length is shortened. Therefore, the occurrences of cracking and the like at the ridgeline portions of the element body can be suppressed.

Ease of peeling, when inner end portions of the conductive resin layers in the first direction peel from the surfaces of the element body, is different at the ridgeline portions of the element body and at other portions. The inner end portions of the conductive resin layers in the first direction more easily peel at other portions than at the ridgeline portions of the element body. Thereupon, the third length is designed to be shorter than the fourth length, and the difference between the fourth length and the third length is designed to be larger than the difference between the second length and the first length.

That is, a length in the first direction of additional portions of conductive resin layers, with respect to the sintered metal layers, is designed to be longer at the central portions in the second direction than at the end portions in the second direction. This can suppress the exposure of the sintered metal layers even when the inner end portions of the conductive resin layers in the first direction partially peel. As a result, the reliability can be improved and the stress applied to the element body can be relaxed.

In an electronic component according to one aspect of the present invention, a difference between a length of the conductive resin layers in the first direction at the side surface and a length of the sintered metal layers in the first direction at the side surface may gradually change in a range from the minimum value, which is a difference between the third length and the first length, to the maximum value, which is a difference between the fourth length and the second length. In this case, the exposure of the sintered metal layers can be further suppressed.

In an electronic component according to one aspect of the present invention, the third length may be longer than the second length. In this case, the sintered metal layers can be securely covered by the conductive resin layers.

In an electronic component according to one aspect of the present invention, the difference between the fourth length and the third length may be 1.1 times or more to 5.0 times or less than the difference between the second length and the first length. In this case, the occurrences of a short circuit failure and reduction in withstand voltage due to shortening of the distance between the terminal electrodes can be suppressed and the sintered metal layers are securely covered by the conductive resin layers.

In an electronic component according to one aspect of the present invention, the third length may be shorter than the second length. In this case, the amount of resin used to form the conductive resin layers can be reduced and the sintered metal layers are securely covered by the conductive resin layers.

DETAILED DESCRIPTION

Detailed descriptions of embodiments will be made below with reference to accompanying drawings. In the descriptions, the same signs are used for the same elements and elements having the same functions, and redundant descriptions are omitted.

Figure 1:
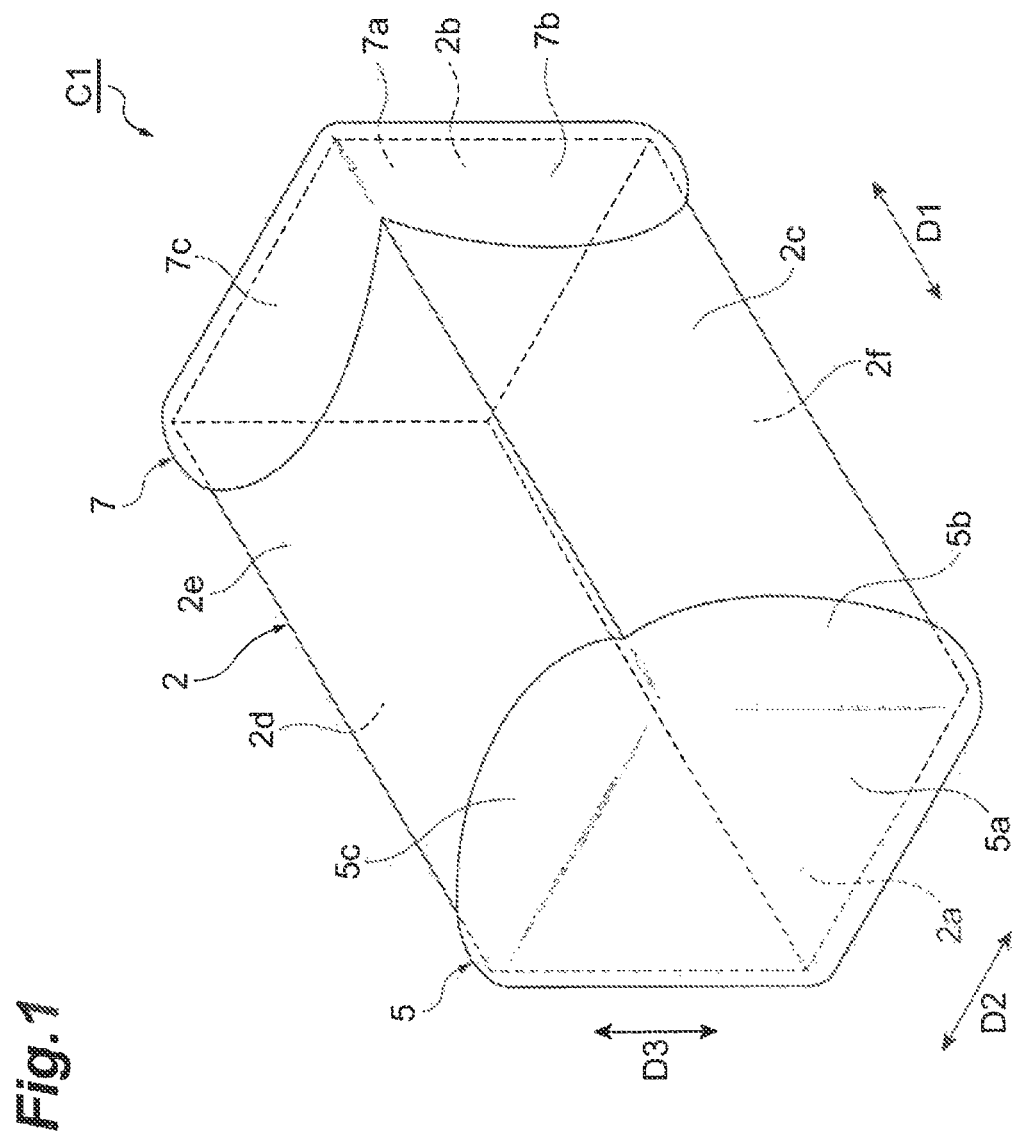
FIG. 1 is a perspective view showing a laminated capacitor according to an embodiment.
Figure 2:
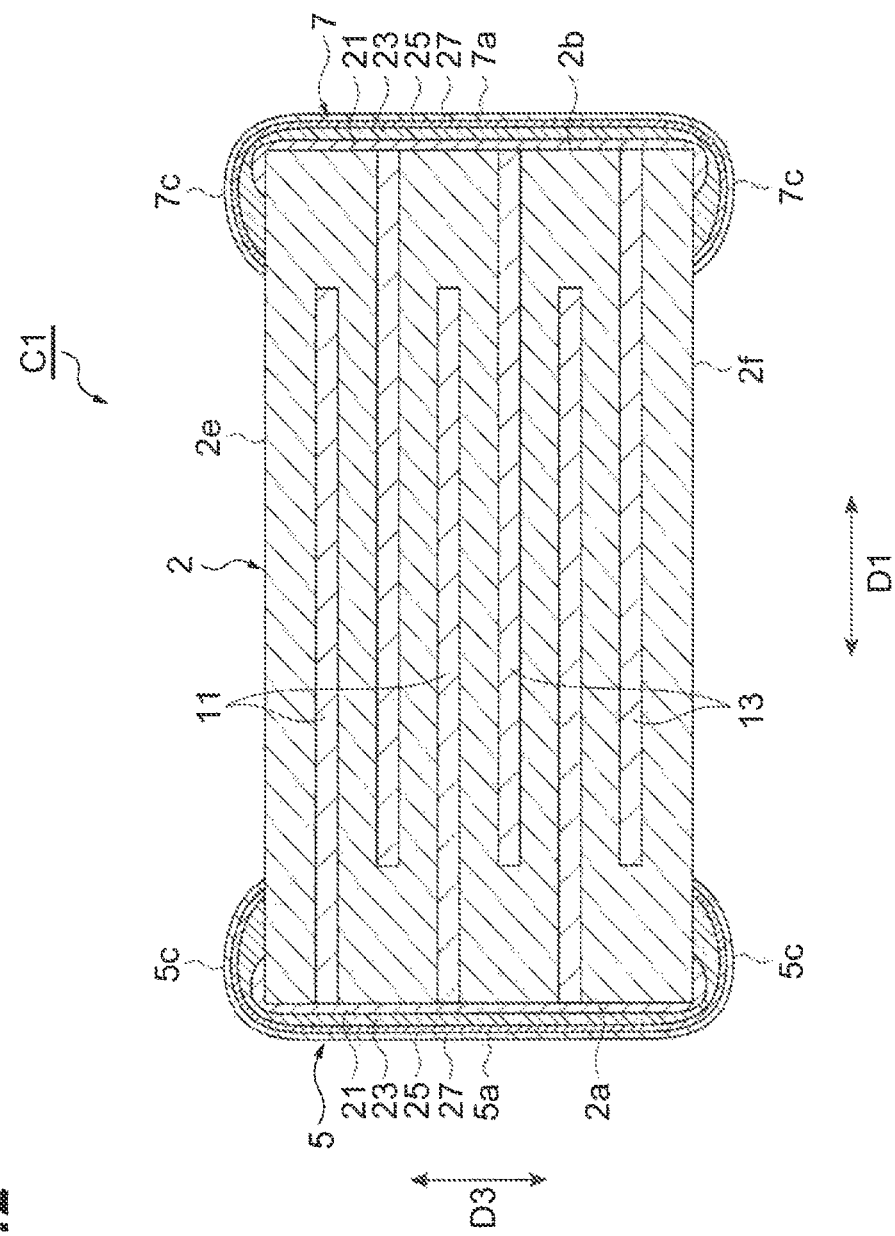
FIG. 2 is a drawing for illustrating a cross-section structure of the laminated capacitor according to an embodiment.

A description of the structure of a laminated capacitor C1 according to an embodiment will be made with reference to FIGS. 1 and 2. FIG. 1 is a perspective view showing a laminated capacitor according to an embodiment. FIG. 2 is a drawing for illustrating a cross-section structure of the laminated capacitor according to an embodiment. The embodiments will be described with the laminated capacitor C1 as an example of the electronic component.

As shown in FIG. 1, the laminated capacitor C1 is provided with an element body 2, an external electrode 5 and an external electrode 7. The element body 2 has a rectangular parallelepiped shape. The external electrode 5 and the external electrode 7 are disposed on the outer surfaces of the element body 2. The external electrode 5 and the external electrode 7 are separated from each other. The rectangular parallelepiped shape includes a rectangular parallelepiped shape, in which corner potions and ridgeline portions are chamfered, and a rectangular parallelepiped shape, in which the corner portions and the ridgeline portions are rounded. The external electrodes 5 and 7 are also terminal electrodes.

The element body 2 has a pair of end surfaces 2a and 2b opposing each other, a pair of first side surfaces 2c and 2d opposing each other, and a pair of second side surfaces 2e and 2f opposing each other, as outer surfaces of the element body 2. In the present embodiment, a direction where the pair of end surfaces 2a and 2b opposes (a first direction D1) is a longitudinal direction of the element body 2. A direction where the pair of first side surfaces 2c and 2d opposes (a second direction D2) is a width direction of the element body 2. A direction where the pair of second side surfaces 2e and 2f opposes (a third direction D3) is a height direction of the element body 2. The first to third directions D1 to D3 are orthogonal to each other.

A length of the element body 2 in the first direction D1 is longer than a length of the element body 2 in the second direction D2 and a length of the element body 2 in the third direction D3. The length of the element body 2 in the second direction D2 and the length of the element body 2 in the third direction D3 are the same. That is, in the present embodiment, the pair of end surfaces 2a and 2b have a square shape. The pair of first side surfaces 2c and 2d and the pair of second side surfaces 2e and 2f have rectangular shapes. The length of the element body 2 in the first direction D1 may be the same as the length of the element body 2 in the second direction D2 and the length of the element body 2 in the third direction D3. The length of the element body 2 in the second direction D2 and the length of the element body 2 in the third direction D3 may be different from each other.

In addition to equal values, values including slight differences in a preset range, manufacturing errors or the like may be considered as the same. For example, when multiple values are included in a range of ±5% of the average value of the multiple values, the multiple values are defined as the same.

The pair of first side surfaces 2c and 2d extends in the first direction D1 and connects the pair of end surfaces 2a and 2b to each other. The pair of first side surfaces 2c and 2d also extends in the third direction D3. The pair of second side surfaces 2e and 2f extends in the first direction D1 and connects the pair of end surfaces 2a and 2b to each other. The pair of second side surfaces 2e and 2f also extends in the second direction D2. Herein, the ridgeline portions of the element body 2 are portions which connect two surfaces adjacent to each other among the surfaces 2a to 2f. That is, the end portions of the surfaces 2a to 2f are the ridgeline portions of the element body 2.

The element body 2 is structured by laminating a plurality of dielectric layers in the direction where the pair of second side surfaces 2e and 2f opposes (i.e., the third direction D3.) In the element body 2, a laminating direction of the plurality of dielectric layers (hereinafter, simply referred to as a "laminating direction") corresponds to the third direction D3. Each dielectric layer is structured by a sintered body of a ceramic green sheet which contains, for example, a dielectric material (such as a $BaTiO_3$-based, $Ba(Ti, Zr)O_3$-based or $(Ba, Ca)TiO_3$-based dielectric ceramic). In the actual element body 2, each dielectric layer is so unified that the interface between the dielectric layers is invisible. The second direction D2 may be the laminating direction.

As shown in FIG. 2, the laminated capacitor C1 is provided with a plurality of internal electrodes 11 and a plurality of internal electrodes 13. The internal electrodes 11 and 13 contain a conductive material (e.g., Ni or Cu) usually used as an internal conductor of a laminated electronic component. The internal electrodes 11 and 13 are structured as sintered bodies of conductive pastes containing the conductive material. The internal electrodes 11 and 13 function as internal conductors disposed within the element body 2.

The internal electrodes 11 and the internal electrodes 13 are disposed at different positions (layers) in the third direction D3. That is, the internal electrodes 11 and the internal electrodes 13 are alternately disposed in the third direction D3 with intervals in the element body 2 to oppose each other. A polarity of the internal electrodes 11 and a polarity of the internal electrodes 13 are different from each other. Each of the internal electrodes 11 is exposed at the end surface 2a and is not exposed at other five surfaces 2b, 2c, 2d, 2e and 2f. The internal electrodes 13 are exposed at the end surface 2b and are not exposed at other five surfaces 2a, 2c, 2d, 2e and 2f.

The external electrodes 5 and 7 are disposed on a pair of end portions in the first direction D1 of the element body 2. The external electrodes 5 and 7 are separated from each other in the first direction D1. The external electrode 5 is disposed on the end portion of the end surface 2a of the element body 2 and connected to the internal electrodes 11. The external electrode 7 is disposed on the end portion of the end surface 2b of the element body 2 and connected to the internal electrodes 13.

The external electrode 5 includes electrode portions 5a, 5b and 5c. The electrode portion 5a is positioned at the end surface 2a. The electrode portions 5b are positioned at the first side surfaces 2c and 2d. The electrode portions 5c are positioned at the second side surfaces 2e and 2f. That is, the external electrode 5 is formed at the five surfaces 2a, 2c, 2d, 2e and 2f.

The electrode portions 5a, 5b and 5c, which are adjacent to each other, are connected to each other at the ridgeline portions of the element body 2 and electrically connected to each other. The electrode portion 5a and the electrode portions 5b are connected at the ridgelines portions between the end surface 2a and each of the first side surfaces 2c and 2d. The electrode portion 5a and the electrode portions 5c are connected at the ridgelines portions between the end surface 2a and each of the second side surfaces 2e and 2f.

The electrode portion 5a is disposed to entirely cover exposed portions of the internal electrodes 11 at the end surface 2a. The internal electrodes 11 are directly connected to the external electrode 5. Thus, each of the internal electrodes 11 is electrically connected to the external electrode 5.

The external electrode 7 includes electrode portions 7a, 7b and 7c. The electrode portion 7a is positioned at the end surface 2b. The electrode portions 7b are positioned at the first side surfaces 2c and 2d. The electrode portions 7c are positioned at the second side surfaces 2e and 2f. That is, the external electrode 7 is formed at the five surfaces 2b, 2c, 2d, 2e and 2f.

The electrode portions 7a, 7b and 7c, which are adjacent to each other, are connected to each other at the ridgeline portions of the element body 2 and electrically connected to each other. The electrode portion 7a and the electrode portions 7b are connected at the ridgelines portions between the end surface 2b and each of the first side surfaces 2c and 2d. The electrode portion 7a and the electrode portions 7c are connected at the ridgelines portions between the end surface 2b and each of the second side surfaces 2e and 2f.

The electrode portion 7a is disposed to entirely cover exposed portions of the internal electrodes 13 at the end surface 2b. The internal electrodes 13 are directly connected to the external electrode 7. Thus, each of the internal electrodes 13 is electrically connected to the external electrode 7.

Each of the external electrodes 5 and 7 includes a first electrode layer 21, a second electrode layer 23, a third electrode layer 25 and a fourth electrode layer 27. That is, the electrode portions 5a, 5b and 5c include the first electrode layers 21, the second electrode layers 23, the third electrode layers 25 and the fourth electrode layers 27. The electrode portions 7a, 7b and 7c include the first electrode layers 21, the second electrode layers 23, the third electrode layers 25 and the fourth electrode layers 27.

In other words, the first electrode layers 21, the second electrode layers 23, the third electrode layers 25 and the fourth electrode layers 27 are disposed on each of the surfaces 2a to 2f. The second electrode layers 23 are disposed to entirely cover the first electrode layers 21. The third electrode layers 25 are disposed to entirely cover the second electrode layers 23. The fourth electrode layers 27 are disposed to entirely cover the third electrode layers 25. The fourth electrode layers 27 are structured as the outermost layers of the external electrodes 5 and 7.

The first electrode layers 21 are formed as follows: a conductive paste is adhered onto the surfaces of the element body 2 by an immersing (dipping) method and then fired at a predetermined temperature (e.g., approximately 700° C.). That is, the first electrode layers 21 are sintered metal layers formed by sintering a metal ingredient (metal powder) contained in the conductive paste. In the present embodiment, the first electrode layers 21 are sintered metal layers containing Cu. The first electrode layers 21 may be sintered metal layers containing Ni. Thus, the first electrode layers 21 contain Cu or Ni. For the conductive paste, a mixture of powder, which contains Cu or Ni, a glass ingredient, an organic binder and an organic solvent, is used.

The second electrode layers 23 are formed as follows: a conductive resin in a paste form is adhered to the surfaces of the first electrode layers 21 and the element body 2 by an immersing method and then cured. That is, the second electrode layers 23 are conductive resin layers formed on the first electrode layers 21. For the conductive resin, a mixture of a thermosetting resin, metal powder, an organic solvent and the like is used. As the metal powder, for example, Ag powder or Cu powder is used. As the thermosetting resin, for example, a phenol resin, an acrylic resin, a silicone resin, an epoxy resin or a polyimide resin is used.

The third electrode layers 25 are formed on the second electrode layers 23 by a plating method. In the present embodiment, the third electrode layers 25 are Ni plated layers formed on the second electrode layers 23 by Ni plating. The third electrode layers 25 may be Sn plated layers, Cu plated layers or Au plated layers. Thus, the third electrode layers 25 contain Ni, Sn, Cu or Au.

The fourth electrode layers 27 are formed on the third electrode layers 25 by a plating method. In the present embodiment, the fourth electrode layers 27 are Sn plated layers formed on the third electrode layers 25 by Sn plating. The fourth electrode layers 27 may be Cu plated layers or Au plated layers. Thus, the fourth electrode layers 27 contain Sn, Cu or Au. The third and fourth electrode layers 25 and 27 are plated layers formed on the second electrode layers 23.

Figure 3:
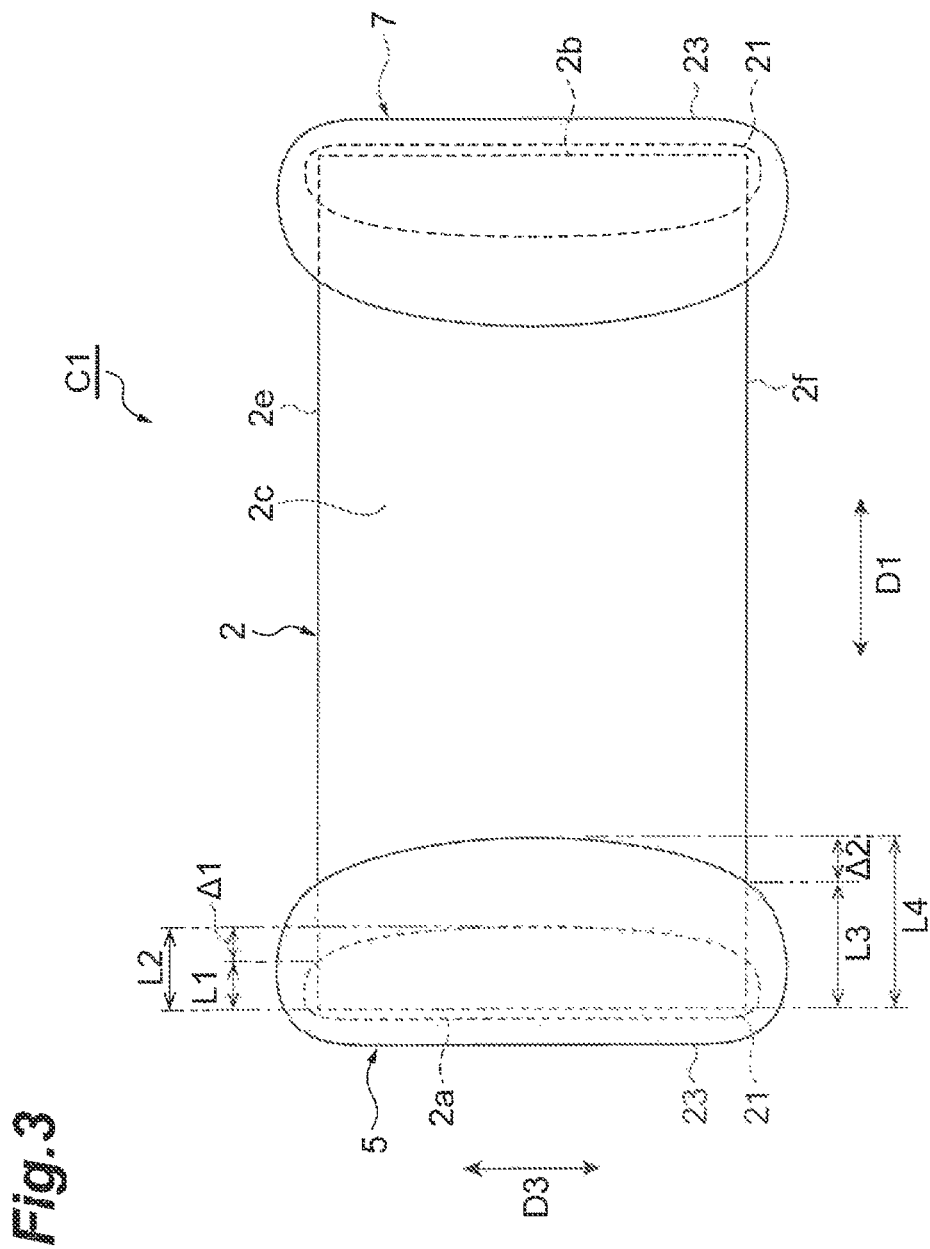
FIG. 3 is a side view of the laminated capacitor according to an embodiment.

Next, a detailed description of the shapes of the first electrode layers 21 and the second electrode layers 23 will be made with reference to FIG. 3. FIG. 3 is a side view of the laminated capacitor according to the present embodiment. In the present embodiment, the shapes of the first electrode layers 21 and the second electrode layers 23 at the first side surfaces 2c and 2d and the second side surfaces 2e and 2f are the same. Thus, a description will be made below based on the shapes of the first electrode layers 21 and the second electrode layers 23 at the first side surface 2c shown in FIG. 3 as examples. In FIG. 3, the third electrode layers 25 and the fourth electrode layers 27 are omitted.

As shown in FIG. 3, a length in the first direction D1 of the first electrode layers 21 at the first side surface 2c is referred to as a first electrode length, and the first electrode length is shorter at the end portions than at the central portions in the third direction D3. Herein, the first electrode layers 21 at the first side surface 2c are first electrode layers 21 disposed on the first side surface 2c and portions which overlap with the first side surface 2c in a view from the second direction D2. That is, the first electrode length is a length in the first direction D1 from an end of the first side surface 2c in the first direction D1 to an inner end of the first electrode layers 21.

The first electrode length monotonically increases from the end portions to the central portions in the third direction D3. That is, the first electrode length becomes the shortest at the end portions in the third direction D3 and the longest at the central portions in the third direction D3. The first electrode length is adjusted by an upbound amount of the conductive paste upon immersing the element body 2 in the conductive paste. The upbound amount of the conductive paste is a length that the conductive paste rises from a liquid surface along the surfaces of the element body 2. The monotonic increase means that there is no tendency to decrease and means a broad monotonic increase.

A length in the first direction D1 of the second electrode layers 23 at the first side surface 2c is referred to as a second electrode length, and the second electrode length is shorter at the end portions than at the central portions in the third direction D3. Herein, the second electrode layers 23 at the first side surface 2c are second electrode layers 23 disposed on the first side surface 2c and portions which overlap with the first side surface 2c in a view from the second direction D2. That is, the second electrode length is a length in the first direction D1 from an end of the first side surface 2c in the first direction D1 to an inner end of the second electrode layers 23.

The second electrode length monotonically increases from the end portions to the central portions in the third direction D3. That is, the second electrode length becomes the shortest at the end portions in the third direction D3 and the longest at the central portions in the third direction D3. The second electrode length is adjusted by an upbound amount of the conductive resin upon immersing the element body 2 in the conductive resin in a paste form. The upbound amount of the conductive resin is a length that the conductive resin rises from a liquid surface along the surfaces of the element body 2.

A difference between the second electrode length and the first electrode length monotonically increases from the end portions in the third direction D3 to the central portions in the third direction D3. That is, the difference between the second electrode length and the first electrode length becomes the smallest at the end portions in the third direction D3 and the largest at the central portions in the third direction D3. In other words, the difference between the second electrode length and the first electrode length gradually changes in a range from the minimum value, which is a difference between the second electrode length at the end portions in the third direction D3 and the first electrode length at the end portions in the third direction D3, to the maximum value, which is a difference between the second electrode length at the central portions in the third direction D3 and the first electrode length at the central portions in the third direction D3.

A first length is a length of the first electrode layers 21 in the first direction D1 at the end portions of the first side surface 2c in the third direction D3, that is, the first electrode length at the end portions in the third direction D3. A second length is a length of the first electrode layers 21 in the first direction D1 at the central portions of the first side surface 2c in the third direction D3, that is, the first electrode length at the central portions in the third direction D3. A third length is a length of the second electrode layers 23 in the first direction D1 at the end portions of the first side surface 2c in the third direction D3, that is, the second electrode length at the end portions in the third direction D3. A fourth length is a length of the second electrode layers 23 in the first direction D1 at the central portions of the first side surface 2c in the third direction D3, that is, the second electrode length at the central portions in the third direction D3. When the first length is defined as L1, the second length as L2, the third length as L3, the fourth length as L4, a difference between the second length and the first length as $\Delta 1$ (i.e., $\Delta 1 = L2 - L1$) and a difference between the fourth length and the third length as $\Delta 2$ (i.e., $\Delta 2 = L4 - L3$), the following relationships are established.

$$L4 > L3 > L2 > L1$$

$$\Delta 2 > \Delta 1$$

$$5.0 \times \Delta 1 \geq \Delta 2 \geq 1.1 \times \Delta 1$$

When the laminated capacitor is a capacitor of approximately 3216 in size, for example, L1=180 to 280 μm, L2=195 to 320 μm, $\Delta 1$=15 to 40 μm, L3=450 to 650 μm, L4=495 to 725 μm and $\Delta 2$=45 to 75 μm.

In the laminated capacitor C1 structured as above, the first electrode layers 21 are disposed not only on the pair of end surfaces 2a and 2b, but also on the first side surfaces 2c and 2d and on the second side surfaces 2e and 2f. This can suppress the occurrence of a short circuit failure due to invasion of water and the like. The second electrode layers 23 are disposed to completely cover the first electrode layers 21. Thus, for example, when the laminated capacitor C1 is soldered to be implemented onto other electronic devices, the stress applied to the element body 2 upon the solidification of the molten solder can be relaxed.

When the first electrode layers 21 are formed by firing, more stress is applied to the ridgeline portions of the element body 2 than other portions. Thus, the ridgeline portions of the element body 2 are prone to cracking and the like due to the stress applied by firing. Thereupon, the first length is designed to be shorter than the second length. That is, L2>L1. This relaxes the stress applied to the ridgeline portions of the element body 2 by the amount the first length is shortened. Therefore, the occurrences of cracking and the like at the ridgeline portions of the element body 2 can be suppressed.

Ease of peeling, when inner end portions of the second electrode layers 23 in the first direction D1 peel from the surfaces of the element body 2, is different at the ridgeline portions of the element body 2 and at other portions. The inner end portions of the second electrode layers 23 in the first direction D1 more easily peel at other portions than at the ridgeline portions of the element body 2. Thereupon, the third length is designed to be shorter than the fourth length. The difference between the fourth length and the third length is designed to be larger than the difference between the second length and first length. That is, L4>L3 and $\Delta 2 > \Delta 1$.

Thus, at the first side surfaces 2c and 2d, a length in the first direction D1 of additional portions of the second electrode layers 23, with respect to the first electrode layers 21, is designed to be longer at the central portions in the third direction D3 than the end portions in the third direction D3. Similarly, at the second side surfaces 2e and 2f, a length in the first direction D1 of an additional portion of the second electrode layers 23, with respect to the first electrode layers 21, is designed to be longer at the central portions in the second direction D2 than the end portions in the second direction D2. This can suppress the exposure of the first electrode layers 21 even when the inner end portions of the second electrode layers 23 in the first direction D1 partially peel. As a result, the laminated capacitor C1 can improve the reliability and relax the stress applied to the element body 2.

In the laminated capacitor C1, at the first side surfaces 2c and 2d, the difference between the second electrode length and the first electrode length monotonically increases from the end portions in the third direction D3 to the central portions in the third direction D3. Similarly, at the second side surfaces 2e and 2f, the difference between the second electrode length and the first electrode length monotonically increases from the end portions in the second direction D2 to the central portions in the second direction D2. That is, the difference between the second electrode length and the first electrode length gradually changes in a range from the minimum value, which is a difference between the third length and the first length, to the maximum value, which is a difference between the fourth length and the second length. This further suppresses the exposure of the first electrode layers 21.

In the laminated capacitor C1, the third length is longer than the second length. That is, L3>L2. Thus, the first electrode layers 21 can be securely covered by the second electrode layers 23.

In the laminated capacitor C1, the difference $\Delta 2$ is 1.1 times or more to 5.0 times or less than the difference $\Delta 1$. That is, $5.0 \times \Delta 1 \geq \Delta 2 \leq 1.1 \times \Delta 1$. When $\Delta 2 < 1.1 \times \Delta 1$, the second electrode layers 23 may peel at the central portions of the first side surfaces 2c and 2d in the third direction D3 and at the central portions of the second side surfaces 2e and 2f in the second direction D2, thereby exposing the element body 2. As a result, the stress applied to the element body 2 cannot be relaxed by the second electrode layers 23, and cracks may occur in the element body 2.

When $5.0 \times \Delta 1 < \Delta 42$, a short circuit failure, reduction in withstand voltage and the like may occur due to shortening of the distance between the external electrode 5 and the external electrode 7. If L3 is reduced to deal with these problems, the first electrode layers 21 may be exposed. Therefore, by fulfilling the equation $5.0 \times \Delta 1 \geq \Delta 2 \geq 1.1 \times \Delta 1$, the occurrences of a short circuit failure and reduction in withstand voltage due to shortening of the distance between the external electrode 5 and the external electrode 7 can be suppressed and the first electrode layers 21 are securely covered by the second electrode layers 23.

Figure 4:
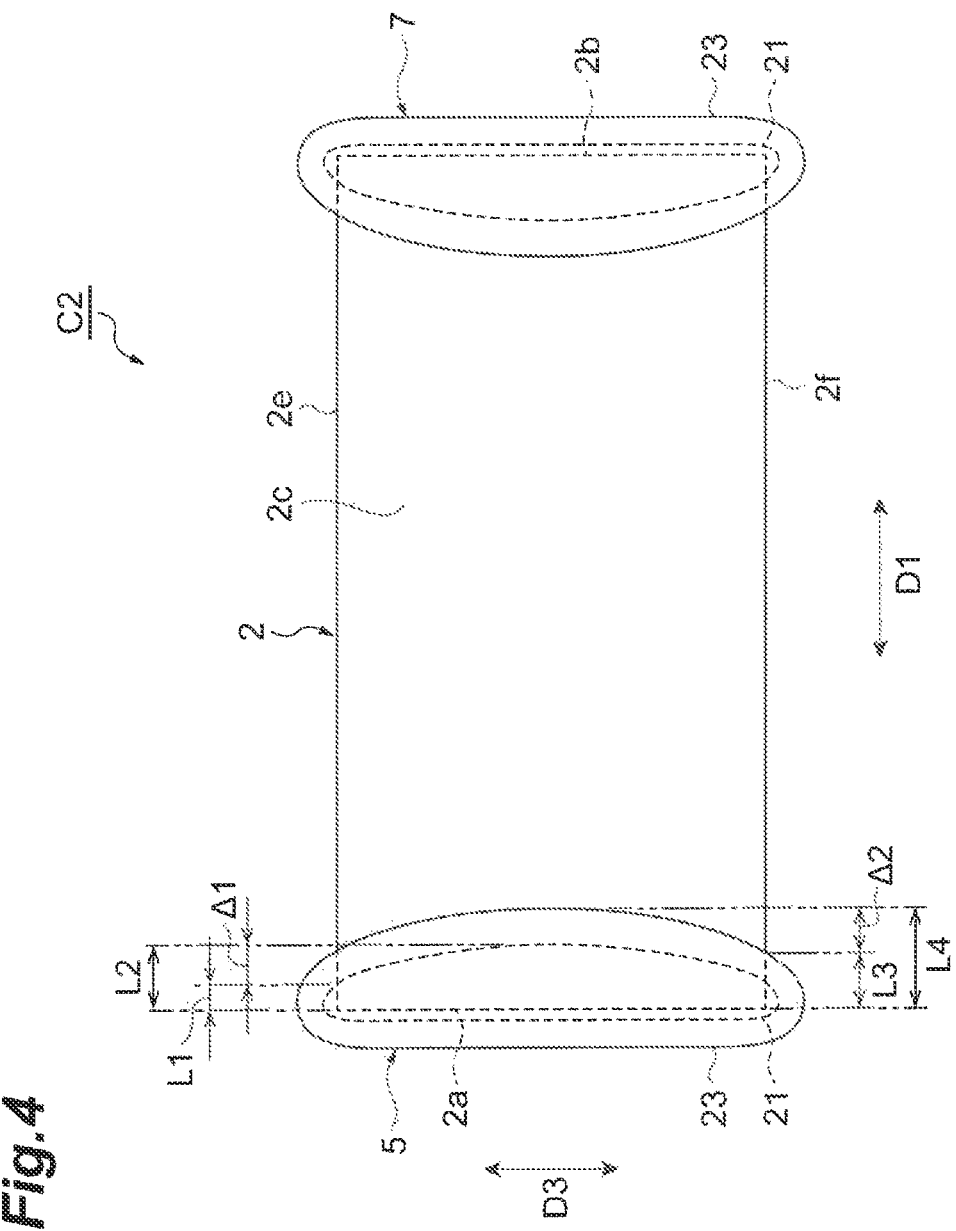
FIG. 4 is a side view of a laminated capacitor according to a modification.

Next, a description of a laminated capacitor C2 according to a modified example will be made with reference to FIG. 4. FIG. 4 is a side view of a laminated capacitor according to a modification. In the present modified example, the shapes of the first electrode layers 21 and the second electrode layers 23 are different from those described in the aforementioned embodiments. The magnitude relationship between L2 and L3 is different from that described in the aforementioned embodiments.

In the present modified example, the laminated capacitor C2 is also provided with an element body 2, an external electrode 5 and an external electrode 7. The external electrode 5 includes an electrode portion 5a, electrode portions 5b and electrode portions 5c. The external electrode 7 includes an electrode portion 7a, electrode portions 7b and electrode portions 7c. Each of the external electrodes 5 and 7 includes a first electrode layer 21, a second electrode layer 23, a third electrode layer 25 and a fourth electrode layer 27.

In the present modified example, the following relationships are established.

$L4 > L2 > L3 > L1$ $\Delta 2 > \Delta 1$ $5.0 \times \Delta 1 \geq \Delta 2 \geq 1.1 \times \Delta 1$ When the laminated capacitor C2 is a capacitor of 3216 in size, for example, L1=170 to 260 μm, L2=220 to 290 μm, Δ1=15 to 50 μm, L3=180 to 270 μm, L4=240 to 340 μm and Δ2=45 to 75 μm.

In the present modified example, a third length is shorter than a second length. That is, L2>L3. Thus, the amount of conductive resin used to form the second electrode layers 23 can be reduced and the first electrode layers 21 are securely covered by the second electrode layers 23.

The present invention is not necessarily limited by the aforementioned embodiments, and various changes can be made within a scope not departing from its gist.

In the laminated capacitors C1 and C2, the shapes of the first electrode layers 21 and the second electrode layers 23 at the first side surfaces 2c and 2d and the second side surfaces 2e and 2f are the same, but are not limited to these shapes. These shapes may be different from each other as long as relationships L2>L1, L4>L3 and Δ2>Δ1 are fulfilled at least at either the first side surfaces 2c and 2d or the second side surfaces 2e and 2f.

The external electrodes 5 and 7 include the third and fourth electrode layers 25 and 27 as a plated layer. That is, the plated layer includes a plurality of plated layers. The plated layer may include only one plated layer. The external electrodes 5 and 7 may not include a plated layer.

The external electrode 5 is formed at the five surfaces 2a, 2c, 2d, 2e and 2f. The external electrode 5 may be formed at the end surface 2a and at least one more side surface which functions as an implementing surface. The external electrode 7 is formed at the five surfaces 2b, 2c, 2d, 2e and 2f. The external electrode 7 may be formed at the end surface 2b and at least one more side surface which functions as an implementing surface.

The present embodiments have been described with the laminated capacitors C1 and C2 as the examples of the electronic component. The present invention is not limited to the laminated capacitors C1 and C2 and may be applied to laminated electronic components such as laminated inductors, laminated varistors, laminated piezoelectric actuators, laminated thermistors or laminated composite components, or electronic components other than the laminated electronic components.

What is claimed is:

1. An electronic component, comprising:
    an element body which has a rectangular parallelepiped shape and includes a pair of end surfaces opposing each other and a side surface connecting the end surfaces to each other, in which internal conductors are exposed at the pair of the end surfaces; and
    a pair of terminal electrodes separated from each other in a first direction where the pair of end surfaces oppose and connected to the internal conductors, wherein
    the terminal electrodes include
        sintered metal layers disposed at the end surfaces and the side surface, and
        conductive resin layers entirely covering the sintered metal layers,
    a first length, which is a length of the sintered metal layers in the first direction at end portions of the side surface in a second direction orthogonal to the first direction, is shorter than a second length, which is a length of the sintered metal layers in the first direction at central portions of the side surface in the second direction,
    a third length, which is a length of the conductive resin layers in the first direction at the end portions, is shorter than a fourth length, which is a length of the conductive resin layers in the first direction at the central portions, and
    a difference between the fourth length and the third length is larger than a difference between the second length and the first length.

2. The electronic component according to claim 1, wherein a difference between a length of the conductive resin layers in the first direction at the side surface and a length of the sintered metal layers in the first direction at the side surface gradually changes in a range from a minimum value, which is a difference between the third length and the first length, to a maximum value, which is a difference between the fourth length and the second length.

3. The electronic component according to claim 1, wherein the third length is longer than the second length.

4. The electronic component according to claim 1, wherein the difference between the fourth length and the third length is 1.1 times or more to 5.0 times or less than the difference between the second length and the first length.

5. The electronic component according to claim 1, wherein the third length is shorter than the second length.

* * * * *